US008135890B2

(12) United States Patent
Woo et al.

(10) Patent No.: US 8,135,890 B2
(45) Date of Patent: Mar. 13, 2012

(54) SELECTIVE SWITCHING OF A MEMORY BUS (75) Inventors: Steven C. Woo, Saratoga, CA (US); Scott C. Best, Palo Alto, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

(21) Appl. No.: 12/428,114

(22) Filed: Apr. 22, 2009

(65) Prior Publication Data

US 2009/0300260 A1 Dec. 3, 2009

Related U.S. Application Data

(60) Provisional application No. 61/056,513, filed on May 28, 2008.

(51) Int. Cl.
*G06F 13/00* (2006.01)

(52) U.S. Cl. .............................. 710/100; 710/305

(58) Field of Classification Search .................. 710/100, 710/300, 315, 305–306; 711/154, 167
See application file for complete search history.

(56) References Cited

U.S. PATENT DOCUMENTS

| 4,071,808 A | * | 1/1978 | Zentmyer ............... 315/241 R |
| 5,550,990 A | * | 8/1996 | Keener et al. .............. 710/315 |
| 6,215,686 B1 | | 4/2001 | Deneroff et al. ............ 365/52 |
| 6,530,033 B1 | | 3/2003 | Raynham et al. ............ 714/5 |
| 6,934,785 B2 | * | 8/2005 | Lee et al. ................... 710/300 |
| 2005/0246471 A9 | * | 11/2005 | Liaw et al. .................. 710/305 |
| 2008/0301352 A1 | * | 12/2008 | Bland et al. ................ 710/316 |

OTHER PUBLICATIONS

Kentron, Quad Band Memory (QBM), The "QBM Enabled" VIA PT880/PM80 Chipset Solutions with the Fastest Memory. Published Jul. 21, 2003. 12 Pages.

* cited by examiner

*Primary Examiner* — Mark Rinehart
*Assistant Examiner* — Kim Huynh
(74) *Attorney, Agent, or Firm* — Park, Vaughan, Fleming & Dowler LLP; Steven E. Stupp (57) ABSTRACT

In a system, a memory bus has a first bus segment coupled to a memory controller that includes control logic and a first memory device, a second bus segment coupled to a second memory device, and a switch to selectively couple and decouple the first bus segment and the second bus segment in response to control information from the control logic. Note that the control logic may output control information to the switch to selectively decouple the first bus segment and the second bus segment to effect a change in an electrical length of the memory bus to enable data transfer with respect to the first memory device at a first data rate. Additionally, the control logic may output control information to the switch to selectively couple the first bus segment and the second bus segment to effect another change in the electrical length of the memory bus to enable data transfer with respect to the second memory device at a second data rate that is slower than the first data rate.

48 Claims, 9 Drawing Sheets

```
                                                                    ┌─ 300
┌─────────────────────────────────────────────────────────────────────┐
│  SELECT A STATE OF A SWITCH BETWEEN A FIRST MEMORY DEVICE COUPLED   │
│   TO A MEMORY BUS IN A FIRST PERFORMANCE REGION OF THE MEMORY BUS   │
│      AND A SECOND MEMORY DEVICE COUPLED TO THE MEMORY BUS IN A      │
│      SECOND PERFORMANCE REGION OF THE MEMORY BUS TO CHANGE AN       │
│  ELECTRICAL LENGTH OF THE MEMORY BUS, WHERE A GIVEN PERFORMANCE     │
│    REGION, WHICH CAN BE THE FIRST PERFORMANCE REGION OR THE SECOND  │
│      PERFORMANCE REGION, CONVEYS INFORMATION AT A GIVEN DATA RATE   │
│                                  310                                │
└─────────────────────────────────────────────────────────────────────┘
                                  │
                                  ▼
┌─────────────────────────────────────────────────────────────────────┐
│       COMMUNICATE WITH A GIVEN MEMORY DEVICE, WHICH CAN BE THE FIRST│
│             MEMORY DEVICE OR THE SECOND MEMORY DEVICE, WHERE        │
│      COMMUNICATION WITH THE FIRST MEMORY DEVICE IS AT A FIRST DATA  │
│       RATE AND COMMUNICATION WITH THE SECOND MEMORY DEVICE IS AT A  │
│  SECOND DATA RATE, AND WHERE THE SECOND DATA RATE IS LESS THAN THE  │
│                             FIRST DATA RATE                         │
│                                  312                                │
└─────────────────────────────────────────────────────────────────────┘
```

FIG. 3A

```
                                                    ┌─ 350
┌─────────────────────────────────────────────────────────────┐
│ SELECT A STATE OF A SWITCH BETWEEN A FIRST MEMORY DEVICE COUPLED │
│   TO A MEMORY BUS AND A SECOND MEMORY DEVICE COUPLED TO THE  │
│  MEMORY BUS TO CHANGE AN ELECTRICAL LENGTH OF THE MEMORY BUS │
│                             360                              │
└─────────────────────────────────────────────────────────────┘
                              │
                              ▼
┌─────────────────────────────────────────────────────────────┐
│ MODIFY ON-DIE TERMINATION (ODT) OF A GIVEN MEMORY DEVICE, WHICH │
│  CAN BE THE FIRST MEMORY DEVICE OR THE SECOND MEMORY DEVICE, │
│               BASED ON THE STATE OF THE SWITCH               │
│                             362                              │
└─────────────────────────────────────────────────────────────┘
```

SELECTIVE SWITCHING OF A MEMORY BUS

RELATED APPLICATION

This application hereby claims priority under 35 U.S.C. §119 to U.S. Provisional Application No. 61/056,513, entitled "Selective Switching of a Memory Bus," by Steven C. Woo and Scott C. Best, filed 28 May 2008.

TECHNICAL FIELD

The present embodiments relate to memory buses. More specifically, the present embodiments relate to circuits and methods for selectively switching and/or terminating portions of a memory bus.

BRIEF DESCRIPTION OF THE FIGURES

Note that like reference numerals refer to corresponding parts throughout the drawings.

DETAILED DESCRIPTION

As data rates in memory systems increase, it is becoming increasingly difficult to maintain communication performance using a multi-drop or stub-bus memory-bus topology, where each memory device or memory module attached to the memory bus appears as a parasitic load to the other memory devices or memory modules. Consequently, as data rates increase, the maximum number of memory devices or memory modules per memory channel is decreasing.

Due to the performance limitations associated with these parasitic loads, future high-speed memory buses may include only one double-sided memory module, such as a dual in-line memory module (DIMM), for each memory channel. This may limit the total number of dynamic random access memories (DRAMs) in a memory system, and may consequently limit the overall memory capacity of the memory system. Unfortunately, overall performance of the memory system, which is strongly dependent on the memory capacity, may be adversely affected by these trends, even though memory data rates may be increasing. For example, insufficient memory capacity may lead to an increase in the number of disk-drive accesses, which are often slow and can significantly degrade system performance.

Figure 1A:
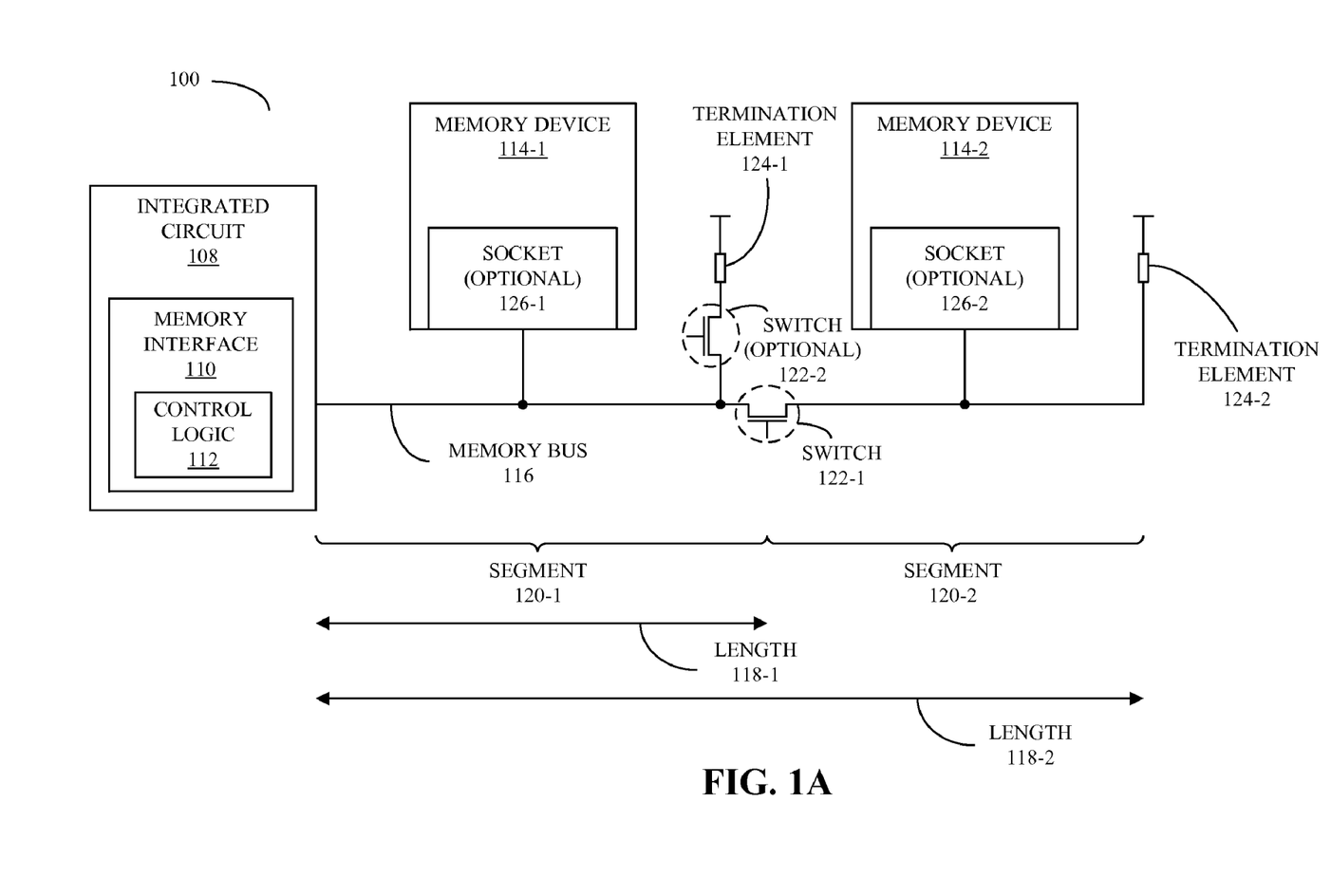
FIG. 1A is a block diagram illustrating an embodiment of a system.

In the discussion that follows, embodiments of a circuit, an integrated circuit that includes the circuit, a system that includes control logic (such as on a memory controller or a processor) and multiple memory devices, and a technique for communicating data that addresses these challenges are described. FIG. 1A presents a block diagram illustrating an embodiment of a system 100. In this system, an integrated circuit 108, which includes a memory interface 110, communicates data and/or commands with memory devices 114, including a memory device 114-1 that is proximate to integrated circuit 108 and a memory device 114-2 that is distal from integrated circuit 108, via a memory bus 116, such as a multi-drop memory bus. The memory bus may be terminated using discrete termination elements 124, which have associated termination impedances that can be: fixed, adjustable, external (as shown in FIG. 1A), or internal (which is sometimes referred to as on-die terminations or ODTs). Moreover, memory bus 116 may have a length, such as length 118-1 or length 118-2, that can be modified by selectively changing a state of at least one of switches 122, such as switch 122-1, which is between at least two of the memory devices 114, based on instructions or signals from control logic 112 in the memory interface 110. More generally, memory bus 116 may have a variable length (such as one of lengths 118) that can include multiple segments 120 (each of which includes at least one of the memory devices 114), which is defined by electrical continuity of data flow from one segment to the next.

Figure 1B:
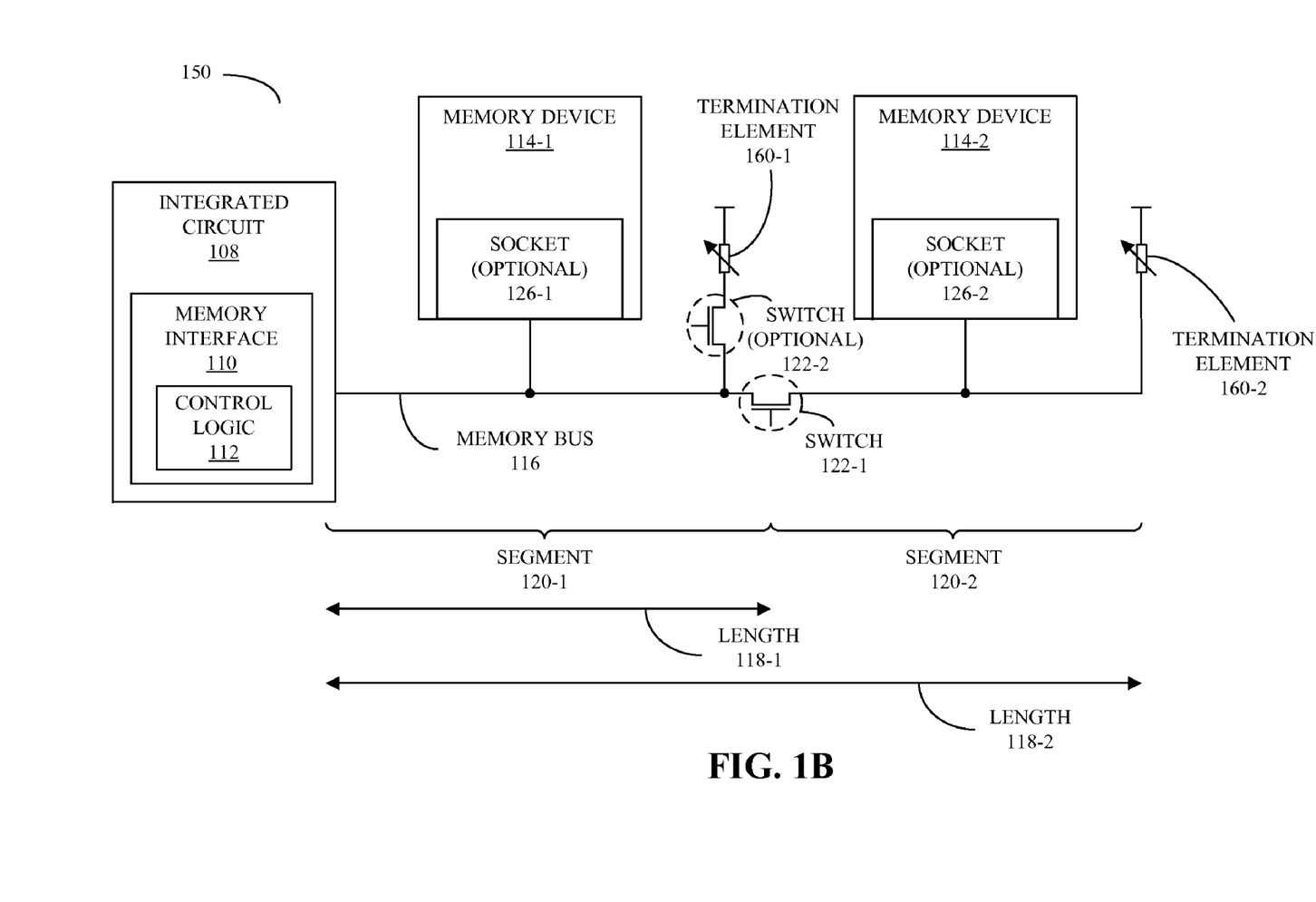
FIG. 1B is a block diagram illustrating an embodiment of a system.

Note that control logic 112 may instruct memory device 114-1 to be inactive when switch 122-1 is closed and to be active when switch 122-1 is open. (Alternatively, memory device 114-1 may inactivate itself.) Similarly, control logic 112 may instruct memory device 114-2 to be active when switch 122-1 is closed and to be inactive when switch 122-1 is open. By selectively activating memory devices 114 and changing the length of the memory bus 116 (and thus, the associated parasitic capacitance), control logic 112 may facilitate communication between integrated circuit 108 and a given memory device in the memory devices 114. Moreover, as shown in FIG. 1B, which presents a block diagram illustrating an embodiment of a system 150, in some embodiments control logic 112 provides instructions or signals that modify or adjust either or both of the termination impedances 160 based on the state of at least switch 122-1.

In some embodiments, the integrated circuit 108 is a memory controller. This memory controller may be included in: a stand-alone die, a chipset (such as North Bridge) and/or in a processor. While FIGS. 1A and 1B illustrate control logic 112 implementing at least a portion of the functionality of memory interface 110, in general control logic 112 may implement a variety of functions in a memory controller, including: changing the state of one or more switches 122, changing an impedance of one or more termination elements 160, and/or issuing commands to one or more memory devices 114.

Moreover, systems 100 (FIG. 1) and 150 may be memory systems and/or the memory devices 114 may be included in memory modules (such as DIMMs). For example, memory devices 114 may be disposed on memory modules. Additionally, switches 122 may include one or more field-effect transistor (FET) switches.

In some embodiments, memory bus 116 includes multiple performance regions, such as segments 120. These performance regions may be associated with multiple data rates for communicating data between integrated circuit 108 and the given memory device. Memory device 114-1 may be situated in a first performance region of memory bus 116, in which data is communicated at a first data rate, and memory device 114-2 may be situated in a second performance region of memory bus 116, in which data is communicated at a second data rate. Note that because the first performance region is electrically closer to the integrated circuit 100 than is the second performance region, it may be easier to achieve higher speeds of operation within the first performance region (e.g., the first data rate may be greater than the second data rate).

Consequently, by selectively changing the attenuation associated with the memory bus 116, systems 100 (FIG. 1A) and 150 may facilitate an increase in the memory capacity without degrading the performance of the first performance region. Additionally, systems 100 (FIG. 1A) and 150 may extend the use of existing memory devices, memory modules, and/or technology, such as multi-drop memory-bus technology or lower data-rate memory devices.

Embodiments of the circuit, the integrated circuit, the system and/or the technique may be used during inter-chip and/or intra-chip communication. For example, these techniques may be used in memory systems and/or memory devices that include different types of memory, such as: volatile memory, non-volatile memory, dynamic random access memory (DRAM), static random access memory (SRAM), read-only memory (ROM), erasable programmable read-only memory (EPROM), electrically erasable programmable read-only memory (EEPROM), flash memory, solid-state memory, and/or another type of memory. Moreover, for a given type of memory, these techniques may be used in different memory technologies or technology generations (which may use different power supply voltages). For example, these techniques may be used in: extreme data rate (XDR), dual-data rate (DDR), graphics dual-data rate (GDDR) and/or synchronous DRAM, such as: DDR2, DDR3, DDRx, GDDR1, GDDR3, GDDR5, and/or mobile DDR.

Consequently, components (such as a memory controller, a memory device, a memory module, and/or a memory system) that use these techniques may be included in a wide variety of applications, such as: desktop or laptop computers, computer systems, hand-held or portable devices (such as personal digital assistants and/or cellular telephones), set-top boxes, home networks, and/or video-game devices. Moreover, one or more of these embodiments may be included in a communication channel, such as: serial or parallel links, metropolitan area networks, local area networks (LANs), and/or personal area networks (PANs).

Embodiments of the circuit and the system to communicate data are now further described. Referring back to FIG. 1A, as noted previously, by segmenting memory bus 116, system 100 may facilitate increased memory capacity while also improving system performance. In particular, memory bus 116 may be segmented into multiple performance regions or segments 120, where each region may include memory devices that operate at different signaling speeds, but which co-exist on memory bus 116.

In system 100, memory bus 116 has two memory devices 114 coupled to it, and switches 122 may facilitate the use of memory devices 114 that have different data rates. Note that the data rate of communication with the memory devices 114 may depend on the current length (such as length 118-1 or length 118-2) of the memory bus 116 and the number of memory devices 114 coupled to the memory bus 116. In general, because of the capacitive loading on the memory bus 116, the farther a given memory device is from integrated circuit 108, the slower the data rate.

In some embodiments, the data rates may be pre-determined. For example, in the discussion that follows, memory device 114-1 is included in one generation of a dual-data-rate memory module (such as DDR2-800) having the first data rate and memory device 114-2 is included in another generation of a dual-data-rate memory module (such as DDR2-400) having the second data rate. In this example, switches 122 may be used to segment memory bus 116 into a shorter memory bus with the DDR2-800 memory module coupled to it, or into a longer memory bus with the DDR2-800 memory module and the DDR2-400 memory module coupled to it.

In particular, when memory accesses are directed to the near memory module, the state of switches 122 may be selectively changed (in particular, switch 122-1 may be opened and optional switch 122-2 may be closed) to segment the memory bus 116 and to electrically disconnect the far memory module. In this way, the length of the memory bus 116 may be shortened (for example, from length 118-2 to length 118-1) and the number of drops may be reduced, thereby allowing higher data rates to be achieved.

Similarly, when memory accesses are directed to the far memory module, the state of switches 122 may be selectively changed (in particular, switch 122-1 may be closed and optional switch 122-2 may be opened) to electrically connect the far memory module. In this case, the memory bus 116 may not be able to support data rates that are as high as when the memory bus 116 is shorter (i.e., the second data rate may be less than the first data rate).

Note that the different data rates may be supported using the same memory bus 116 by using a first data rate that is an integer multiple of the second data rate. For example, the first data rate of the DDR2-800 memory module is twice the second data rate of the DDR2-400 memory module. When communicating data with the far memory module, half of the first data rate can be implemented by transmitting data for two consecutive symbol times instead of one symbol time. (The consequences of such switching on the timing diagram are discussed below with reference to FIGS. 2A and 2B.)

Continuing the discussion of FIG. 1B, the last memory device on the memory bus 116 that is coupled to integrated circuit 108 (e.g., the one that does not have a memory-channel stub 'after' it leading to other memory devices) often has an improved communication performance metric, such as larger voltage or timing margin, usually represented by a 'wider' data eye pattern. Consequently, in some embodiments control logic 112 selectively changes the state of switches 122 so that memory bus 116 has the minimum length necessary to couple the active memory device to integrated circuit 108. Moreover, control logic 112 may adjust or modify one or more of the termination impedances 160 (such as external termination resistors or internal ODT devices) based on the state of one or more of the switches 122. In particular, the termination impedance for the active memory device may be 'on' and the termination impedance of all preceding memory devices may be 'off.' Note that this selective control of termination resistors, in conjunction with control of the state of one or more of the switches 122, allows the all of the segments 120 to achieve similar performance (e.g., the same data rate).

In some embodiments, termination impedance 160-1 is modified or adjusted in conjunction with a state of the switch 122-1. For example, termination impedance 160-1 may have a first impedance when the switch 122-1 is open, and the termination impedance 160-1 may have a second impedance when the switch 122-1 is closed. Note that the second impedance may be higher than the first impedance. Moreover, termination impedance 160-2 may have a third impedance when switch 122-1 is closed. This third impedance may be less than the second impedance. In general, the termination impedances 160 may be a high impedance (such as the second impedance), which is much larger than an impedance of memory bus 116, and/or may approximately match the impedance of memory bus 116 (such as the first impedance). Alternatively, the first impedance and/or the second impedance may be at some intermediate value between an impedance that matches that of memory bus 116 and the high impedance.

In an exemplary embodiment, a DDR3 stub-bus memory system includes two memory modules having data rates of 1600 Mbps. In this case, because the first memory module sees a memory bus continuing 'after' it, the first memory module closest to integrated circuit 108 may actually have worse voltage or timing margin compared with the second memory module at the end of memory bus 116 (i.e., the memory module furthest away from integrated circuit 108) may have a larger data eye pattern. This difference may be a result of reflections on memory bus 116, which give rise to interference that is worse at the first memory module than at the second memory module.

In order to support multiple memory modules, the active memory module (e.g., the memory module being read from or written to by the memory controller) may be the last memory module on segmented memory bus 116. This configuration may be implemented using FET isolation switches, for example, on a motherboard or integrated into the memory modules.

Figure 1C:
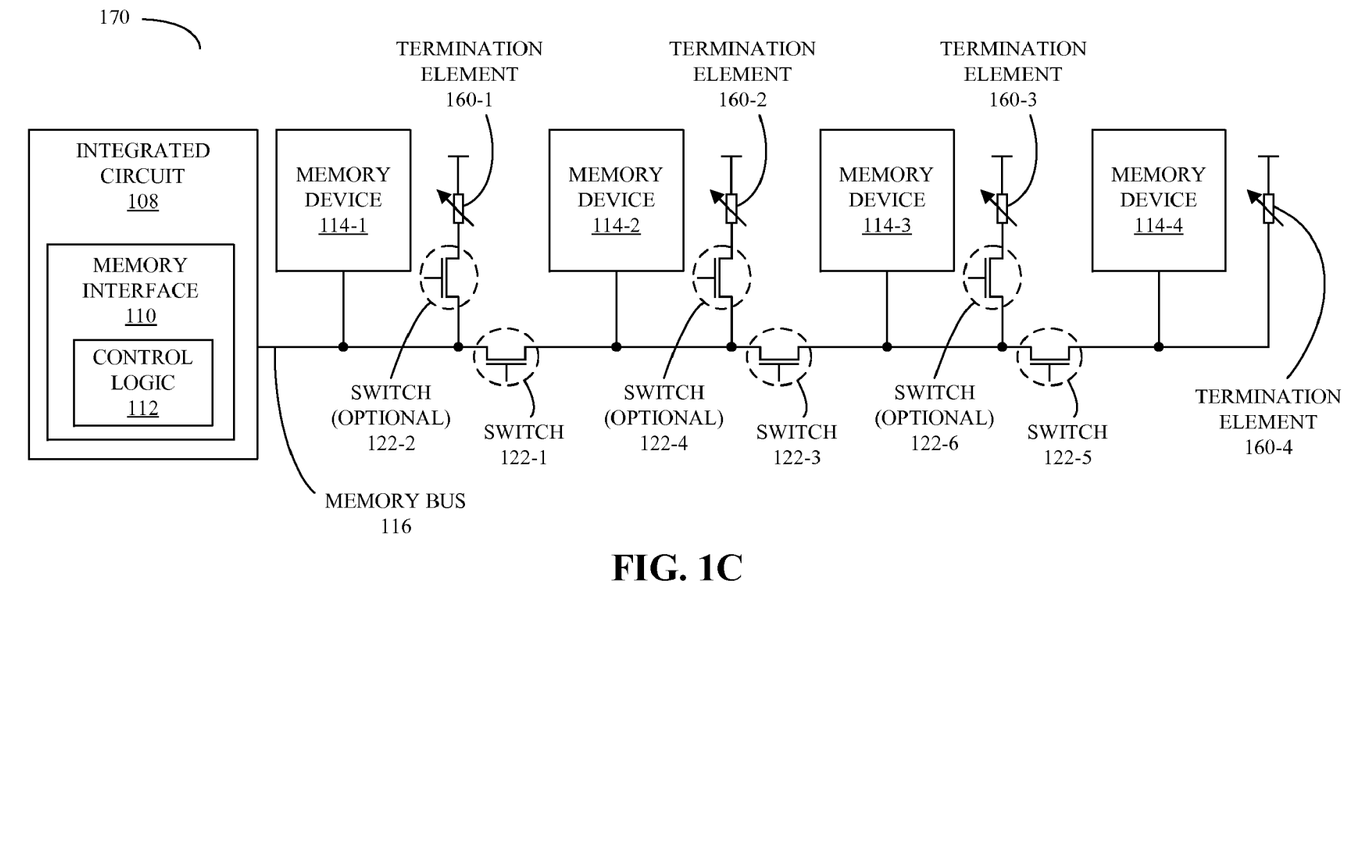
FIG. 1C is a block diagram illustrating an embodiment of a system.

As illustrated in FIG. 1C, in another exemplary embodiment a system 170 includes four memory modules 114, and at least three isolation switches (switch 122-1 between memory modules 114-1 and 114-2, switch 122-3 between memory modules 114-2 and 114-3, and switch 122-5 between memory modules 114-3 and 114-4). When integrated circuit 108 has information to communicate with memory module 114-3, switches 122-1 and 122-3 may be closed, and switch 122-5 may be open. Additionally, a termination impedance 160-3 (such as an ODT) for memory module 114-3 may be activated, while the termination impedances 160-1, 160-2 and 160-4 (such as ODTs) for memory modules 114-1, 114-2 and 114-4 may be in a high-impedance state. In this way, memory module 114-3 may appear to be the 'last' memory module on memory bus 116. Note that in this memory system, the stub length after memory module 114-3 (e.g., prior to switch 122-5) may limit the data rate.

Segmentation of memory bus 116 may have a small impact on integrated circuit 108 (most of the changes may impact the circuit-board design). Moreover, memory devices, memory modules, and/or connectors may be unaffected, which may ease adoption of this technique. This approach may allow existing memory devices 114 and/or memory bus 116 to be leveraged in new ways. For example, slower-speed DRAM may be used to increase the memory capacity of systems, such as systems 100 (FIG. 1A) and 150, and the overall performance of these systems may be increased, even though there is increased latency associated with communication with the slower-speed memory devices, because the number of disk-drive accesses may also be decreased.

Additionally, switches 122 and/or termination impedances 160 may be used to improve performance in other ways. For example, data may be migrated between memory devices 114-1 and 114-2 based on: a performance metric and/or power consumption in systems 100 (FIG. 1A) and 150. In some embodiments, inclusive, exclusive, and/or hybrid storage is used (e.g., data is stored in one of the memory devices 114, both of the memory devices 114, and/or a combination of these approaches based on a storage policy or protocol).

Note that a page table and/or a Translation Lookaside Buffer (TLB) in systems 100 (FIG. 1A) and 150 may be modified to facilitate data migration between memory devices 114. In particular, the page table and/or the TLB may include entries for virtual-to-physical memory-address mappings associated with memory device 114-1 and entries for virtual-to-physical memory-address mappings associated with memory device 114-2.

In some embodiments, control logic 112 communicates commands to memory device 114-1 and memory device 114-2 using different command rates. These commands may be communicated using the same links in memory bus 116 that are used to communicate data and/or using one or more separate command links.

While memory-bus segmentation has been illustrated using different types of DRAM, in other embodiments different memory technology may be used on the memory bus 116. For example, either or both of memory devices 114 may be DRAM and/or flash memory, so long as these components have compatible electrical interfaces.

Components and/or functionality illustrated in systems 100 (FIG. 1A) and 150 may be implemented using analog circuits and/or digital circuits. Moreover, circuits may be implemented using NMOS and/or PMOS transistors. Additionally, components and/or functionality in these embodiments may be implemented using hardware and/or software.

These embodiments may include fewer components or additional components, such as one or more additional memory devices 114 and/or intervening switches 122. Additionally, two or more components in systems 100 (FIG. 1A) and 150 can be combined into a single component and/or the position of one or more components can be changed. For example, switches 122 may be external to either of the memory devices 114. However, in other embodiments the switches 122 are disposed on: the connectors for and/or on the die or chip of the given memory device. This approach may facilitate the segmenting of the memory bus 116 while reducing the capacitive loading associated with switches 122.

In some embodiments, one or more of the memory devices 114 include optional sockets 126 for coupling these memory devices to memory bus 116. Note that, for the given memory device, the optional socket may be positioned before or after the switches. However, in some embodiments one or more of the memory devices 114 are soldered to a motherboard.

Moreover, in order to avoid loading the memory bus 114 when the given memory device is not in use, either or both of switches 122 may include a double-pole single-throw switch. Additionally, in embodiments where memory devices 114 are included in memory modules, there may be multiple switches associated with a given memory module. These switches may selectively couple different memory devices in the given memory module to memory bus 116.

Figure 2A:
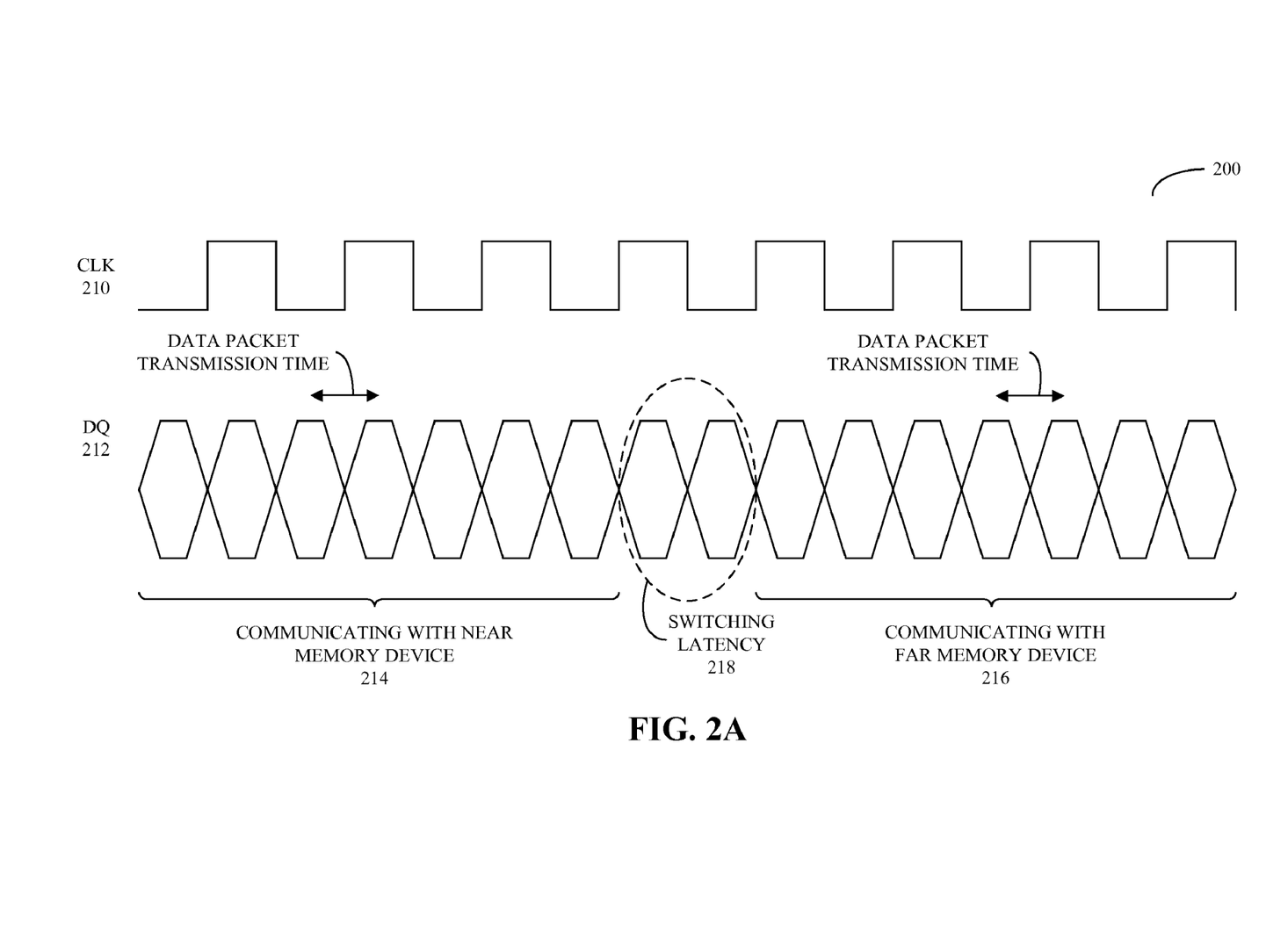
FIG. 2A is a timing diagram illustrating communicating data in a memory bus.

The timing impact of a segmented memory bus is now described. FIG. 2A presents a timing diagram 200 illustrating communicating data in a memory bus. When transitioning from communicating data (DQ) 212 with a near memory device 214 to communicating data (DQ) 212 with a far memory device 216, there may be a switching latency 218 (such as a time to open and/or to close switches 122 in FIGS. 1A and 1B) of several cycles of clock (CLK) 210. Control logic 112 (FIGS. 1A and 1B) and/or memory devices 114 (FIGS. 1A and 1B) may account for this switching latency during data communication.

Figure 2B:
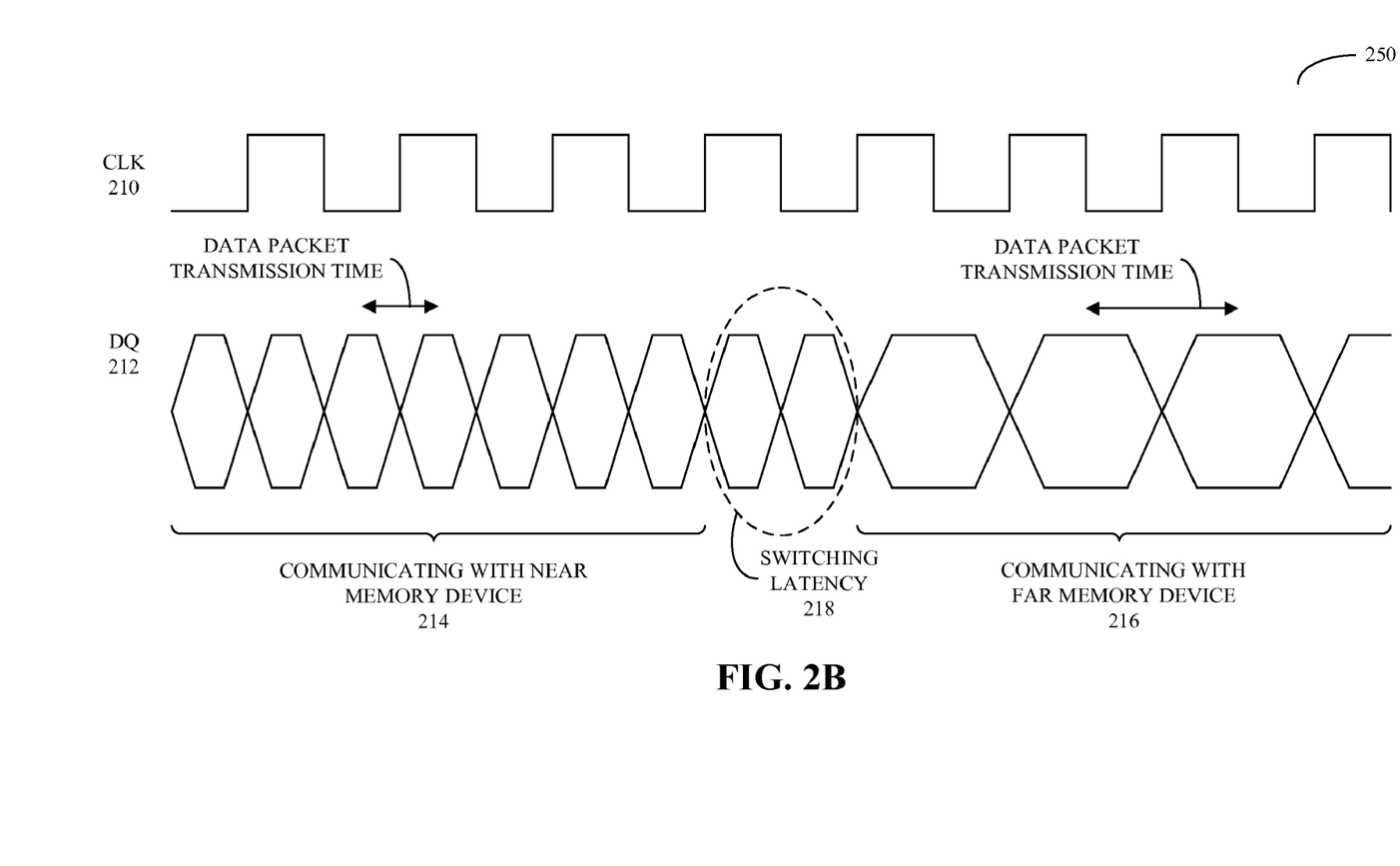
FIG. 2B is a timing diagram illustrating communicating data in a memory bus.

In some embodiments, a lower data rate may be used to communicate data (DQ) 212 with the far memory device 216 than with the near memory device 214. This is illustrated in FIG. 2B, which presents a timing diagram 250 illustrating communicating data in a memory bus. In this embodiment, the data rate for communicating data (DQ) 212 with the far memory device 216 is one half of that for communicating data (DQ) 212 with the near memory device 214.

Figure 3A:
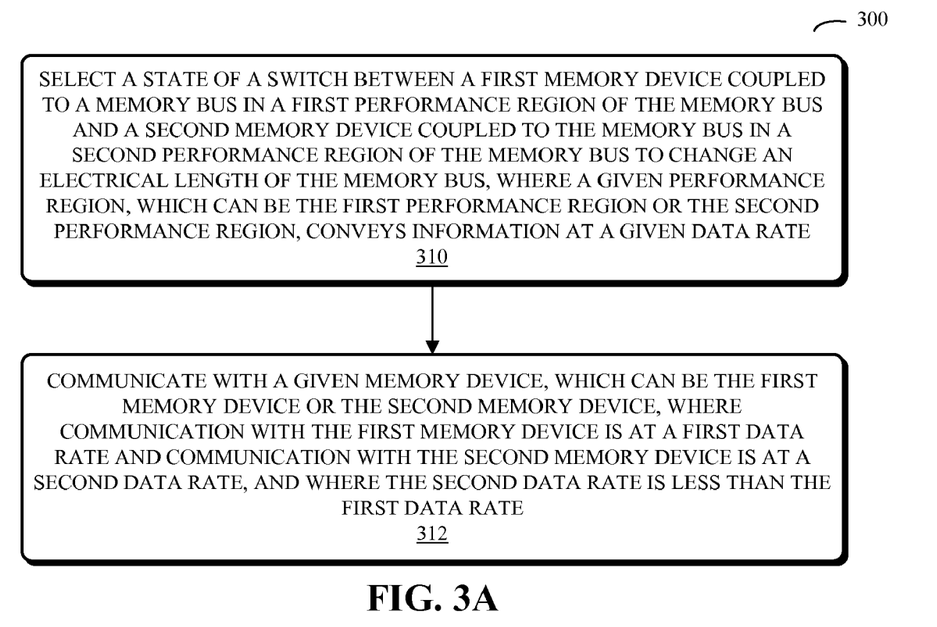
FIG. 3A is a flowchart illustrating an embodiment of a process for communicating data.

Embodiments of a process for communicating data are now described. FIG. 3A is a flowchart illustrating an embodiment of a process 300 for communicating data, which may be performed by control logic in a system (such as control logic in a memory controller and/or control logic in a processor). During operation, the control logic selects a state of the switch between a first memory device coupled to a memory bus in a first performance region of the memory bus and the second memory device coupled to the memory bus in a second performance region of the memory bus to change an electrical length of the memory bus (310). Note that a given performance region, which can be the first performance region or the second performance region, may convey information at a given data rate. Moreover, the control logic may communicate with the given memory device (312), where communication with the first memory device is at the first data rate and communication with the second memory device is at the second data rate, and where the second data rate is less than the first data rate.

Figure 3B:
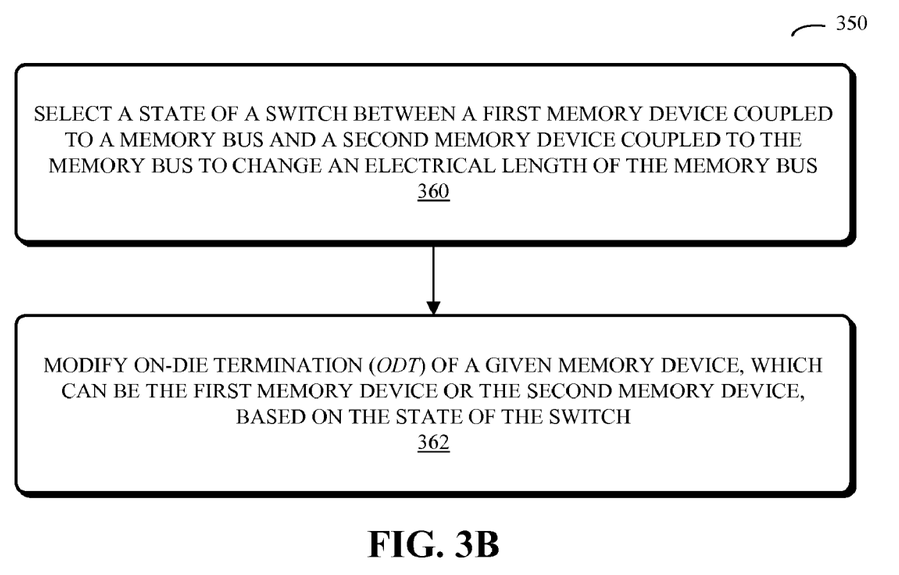
FIG. 3B is a flowchart illustrating an embodiment of a process for communicating data.

FIG. 3B is a flowchart illustrating an embodiment of a process 350 for communicating data, which may be performed by control logic in a system (such as control logic in a memory controller and/or control logic in a processor). During operation, the control logic selects a state of a switch between a first memory device coupled to a memory bus and a second memory device coupled to the memory bus to change an electrical length of the memory bus (360). Moreover, the control logic modifies an ODT of the given memory device, which can be the first memory device or the second memory device, based on the state of the switch (362).

In some embodiments of the processes 300 (FIG. 3A) and 350 there may be fewer or additional operations. Moreover, two or more operations can be combined into a single operation, and/or a position of one or more operations may be changed.

In an exemplary embodiment, the control logic determines the state of the switch based on a received address that indicates which memory module is to be addressed. Then, the control logic outputs one or more control signals to establish continuity between the controller and the address-specified memory module. Next, the control logic decouples all of the memory modules that are more distant or distal from the control logic in the memory controller or the processor than the address-specified memory module.

In some embodiments, chip-select signals, which are typically used to select ranks of memory devices, are used to control one or more switches. For example, in a dual-rank memory module, each switch may include a wired-OR (or an OR gate) to enable either of the rank-select signals (which are sometimes referred to as dual chip-select signals) to establish the state of a given switch. More generally, control logic (such as control logic 112 in FIGS. 1A and 1B) may control one or more switches and/or one or more termination elements by providing signals. These signals may be provided on dedicated signal lines, or as noted above, by sharing one or more common signal lines (such as those used for chip-select signals).

In some embodiments, commands for a transaction associated with a given memory module and returned data (i.e., read data) are separated by a change in the state of a given switch to allow transmission of an intervening command to another memory module that is more distant from the memory controller or the processor than the given memory module.

Figure 4:
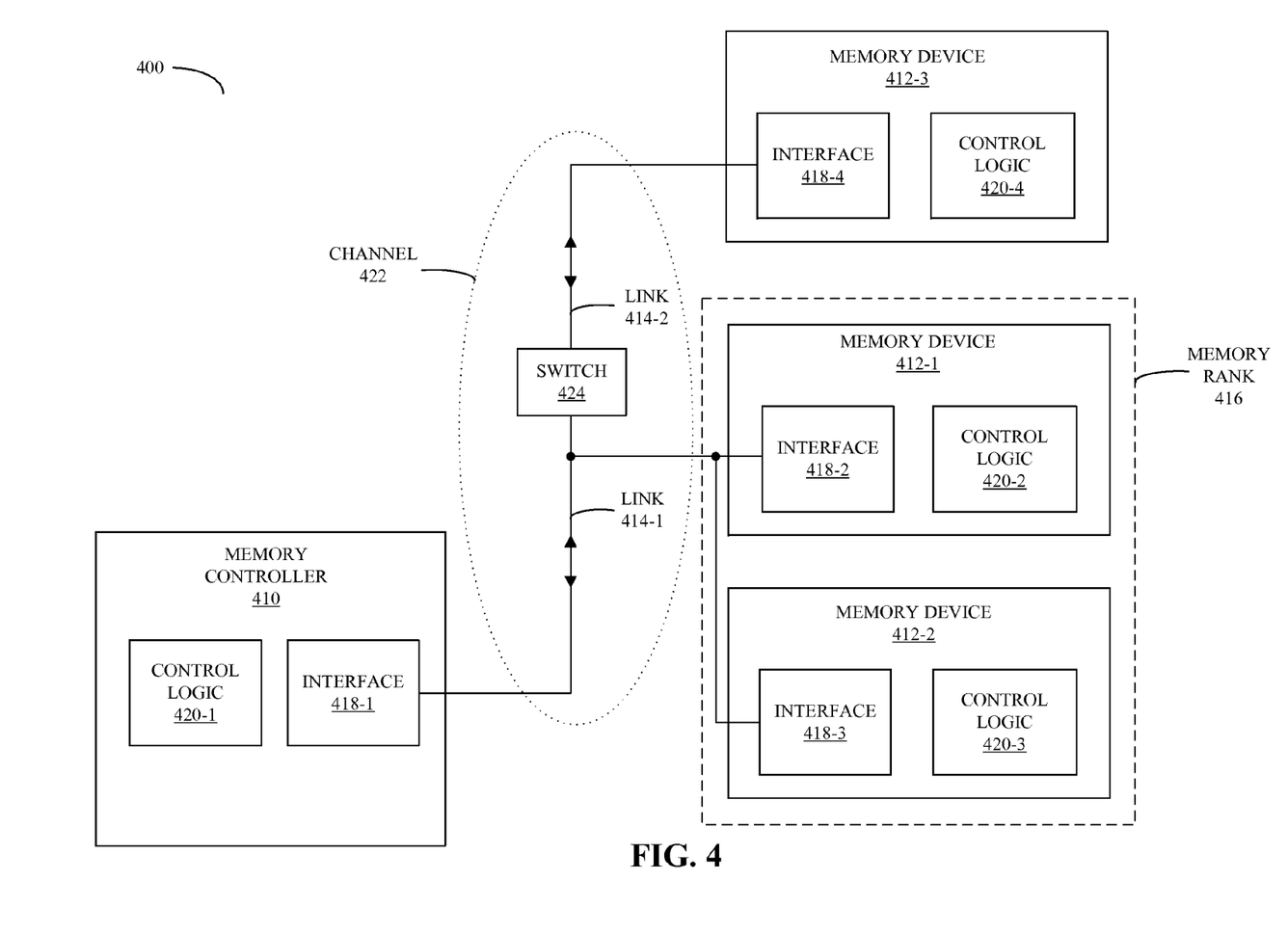
FIG. 4 is a block diagram illustrating an embodiment of a memory system.

Systems that may utilize one or more embodiments of the technique for communicating data are now described. FIG. 4 is a block diagram illustrating an embodiment of a memory system 400. This memory system includes at least one memory controller 410 and one or more memory devices 412, such as one or more memory modules. While FIG. 4 illustrates memory system 400 having one memory controller 410 and three memory devices 412, other embodiments may have additional memory controllers and fewer or more memory devices 412. Moreover, while memory system 400 illustrates memory controller 410 coupled to multiple memory devices 412, in other embodiments two or more memory controllers may be coupled to one another. Memory controller 410 and one or more of the memory devices 412 may be implemented on the same or different integrated circuits, and/or these one or more integrated circuits may be included in a chip-package.

In some embodiments, the memory controller 410 is a local memory controller (such as a DRAM memory controller) and/or is a system memory controller (which may be implemented in a microprocessor).

Memory controller 410 may include an I/O interface 418-1 and control logic 420-1. As discussed previously with reference to FIGS. 1A and 1B, control logic 420-1 may instruct switch 424 to change a length of channel 422 (for example, by providing a signal), thereby selectively coupling memory controller 410 to and/or decoupling memory controller 410 from one or more memory devices 412, such as memory device 412-3. Additionally, control logic 420-1 may instruct one or more interfaces 418 to change termination impedances (such as ODTs) of one or more memory devices 412 (for example, by providing another signal).

In some embodiments, one or more of memory devices 412 include control logic 420 and at least one of interfaces 418. (However, in some embodiments some of the memory devices 412 may not have control logic 420.) This control logic and at least one interface may implement at least a portion of the functionality provided by control logic 420-1 in memory controller 410 or may implement different functionality than that provided by control logic 420-1. Moreover, memory controller 410 and/or one or more of memory devices 412 may include more than one of the interfaces 418, and these interfaces may share one or more control logic 420 circuits. In some embodiments two or more of the memory devices 412, such as memory devices 412-1 and 412-2, may be configured as a memory rank 416 (for example, as a 2-drop rank).

Memory controller 410 and memory devices 412 are coupled by one or more links 414 in channel 422. While memory system 400 illustrates two links 414, other embodiments may have fewer or more links 414. These links may include: wired, wireless and/or optical communication. Moreover, links 414 may be used for bi-directional and/or uni-directional communications between the memory controller 410 and one or more of the memory devices 412. For example, bi-directional communication between the memory controller 410 and a given memory device may be simultaneous (full-duplex communication). Alternatively, the memory controller 410 may transmit information (such as a data packet which includes a command) to the given memory device, and the given memory device may subsequently provide requested data to the memory controller 410, e.g., a communication direction on one or more of the links 414 may alternate (half-duplex communication). In some embodiments, one or more of the links 414 and corresponding transmit circuits and/or receiver circuits are dynamically configured, for example, by one of the control logic 420 circuits, for bi-directional and/or unidirectional communication.

Signals corresponding to data and/or commands (such as request-for-data commands) may be communicated on one or more of the links 414 using either or both edges (e.g., these circuits may use dual data rate) in one or more timing signals. These timing signals may be generated based on one or more clock signals, which may be: generated on-chip (for example, using a phase-locked loop and one or more timing reference signals provided by a frequency reference), off-chip, and/or recovered from the communicated signals. In some embodiments, transmitting and receiving these signals may be synchronous and/or asynchronous.

Moreover, voltage levels and/or a voltage swing of the signals that are transmitted may be based on voltages provided by a power supply, and logic levels of the data that is received may be based on voltages provided by another power supply. These voltages may be fixed or adjustable. Additionally, the signals may be: single ended, differential, and/or pseudo differential, such as multi-wire encoded signals.

In some embodiments, the signals are modulation encoded prior to transmission and decoded after receipt. This encoding may include bit-to-symbol coding in which one or more data bits are mapped together to a data symbol, and the decoding may include symbol-to-bit coding in which one or more symbols are mapped to data bits. Note that the encoding/decoding may include: time-multiplexing, frequency-multiplexing, and/or spread-spectrum coding. Thus, in some embodiments signals are encoded/decoded using: time-division multiple access, frequency-division multiple access, and/or code-division multiple access. Moreover, in some embodiments signals are communicated on the links 414 using discrete multi-tone communication (such as Orthogonal Frequency-Division Multiplexing).

Additionally, the encoding/decoding may include: amplitude modulation, phase modulation, and/or frequency modulation, such as pulse-amplitude modulation (PAM), pulse-width modulation, and/or pulse-code modulation. In some embodiments, the encoding and decoding are at least partially implemented using a look-up table and/or a state machine.

In some embodiments, the coding is dynamically adjusted, for example, based on a performance metric associated with communication on one or more of the links 414. This performance metric may include: a signal strength (such as a signal amplitude or a signal intensity), a mean square error (MSE) relative to a target (such as a detection threshold, a point in a constellation diagram, and/or a sequence of points in a constellation diagram), a signal-to-noise ratio (SNR), a bit-error rate (BER), a timing margin, and/or a voltage margin.

In some embodiments, commands are communicated from the memory controller 410 to one or more of the memory devices 412 using a separate command link that communicates commands. This separate command link may be: wireless, optical and/or wired. However, in some embodiments commands are communicated using the same portion of the channel 422 (i.e., the same links 414) as data. Moreover, communication of commands: may have a lower data rate than the data rates associated with communication of data between the memory controller 410 and one or more of the memory devices 412; may use different carrier frequencies than are used to communicate data; and/or may use a different modulation technique than is used to communicate data.

In some embodiments, the data communicated between the components (such as memory controller 410 and memory device 412-1) and/or stored data may include EDC and/or ECC information. For example, the coding, as well as EDC and/or ECC information, may be based on performance in different segments 120 (FIGS. 1A and 1B).

Moreover, control logic 420 in the memory controller 410 and/or one or more of the memory device 412 may take a variety of remedial actions in the event of an error or a degradation of one or more of the performance metrics during communication between the memory controller 410 and one or more of the memory devices 412. These remedial actions may include: re-transmitting previous data; transmitting previous or new data (henceforth referred to as data) using an increased transmission power than the transmission power used in a previous transmission; reducing the data rate in one or more sub-channels relative to the data rate used in a previous transmission; transmitting data with reduced intersymbol interference (for example, with blank intervals inserted before and/or after the data); adjusting a period of the one or more timing signals; adjusting a skew or delay of the one or more timing signals; transmitting data at a single clock edge (as opposed to dual-data-rate transmission); transmitting data with at least a portion of the data including ECC or EDC; transmitting data using a different encoding or modulation code than the encoding used in a previous transmission; transmitting data after a pre-determined idle time; transmitting data to a different receiver circuit; and/or changing the number of sub-channels in channel 422. In some embodiments one or more of these adjustments are performed: continuously; as needed (for example, based on one or more of the performance metrics); and/or after a pre-determined time interval.

In some embodiments, the remedial action (and more generally adjustments to one or more of the sub-channels) is based on control information that is exchanged between the memory controller 410 and one or more of the memory devices 412. This control information may be exchanged using in-band communication (e.g., via the frequency bands used to communicate the signals corresponding to the data) and/or out-of-band communication (e.g., using the separate link).

In some embodiments, the remedial action and/or adjustments involve an auto-negotiation technique. During this auto-negotiation technique, a receiver circuit in one of the components (such as the memory controller 410) may provide feedback to a transmit circuit in another component (such as memory device 412-1) on the efficacy of any changes to the signals on a given sub-channel. Based on this feedback, the transmit circuit may further modify these signals, e.g., may perform the remedial action.

Devices and circuits described herein may be implemented using computer-aided design tools available in the art, and embodied by computer-readable files containing software descriptions of such circuits. These software descriptions may be: behavioral, register transfer, logic component, transistor and layout geometry-level descriptions. Moreover, the software descriptions may be stored on storage media or may be communicated by carrier waves.

Data formats in which such descriptions may be implemented include, but are not limited to: formats supporting behavioral languages like C, formats supporting register transfer level RTL languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Additionally, physical files may be implemented on machine-readable media such as: 4 mm magnetic tape, 8 mm magnetic tape, 3½ inch floppy media, CDs, DVDs, and so on.

Figure 5:
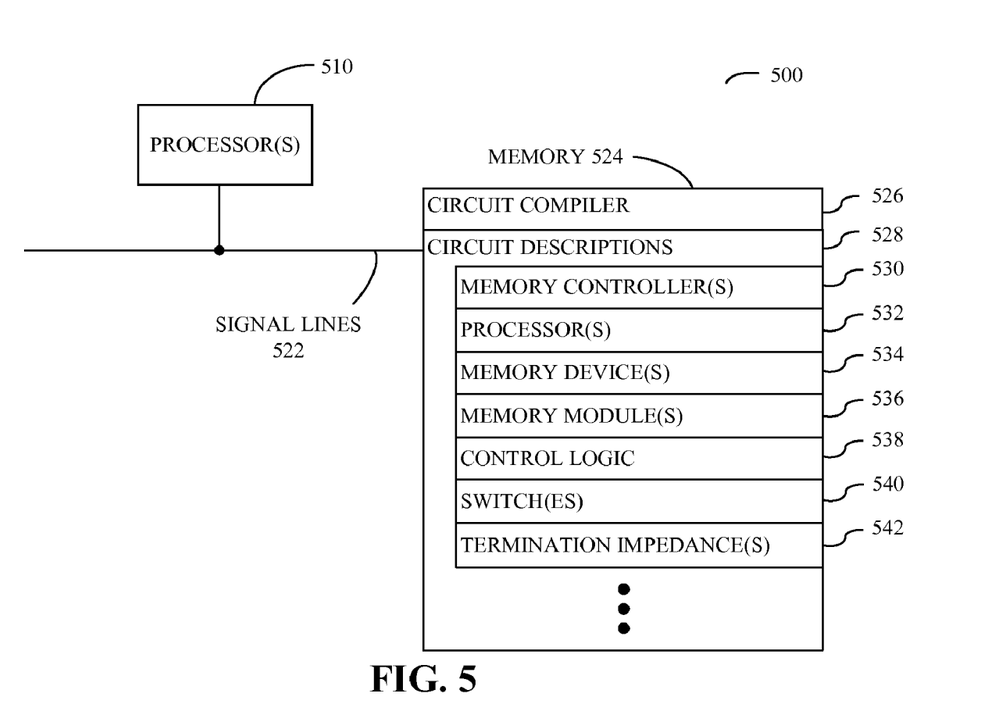
FIG. 5 is a block diagram illustrating an embodiment of a system.

FIG. 5 is a block diagram illustrating an embodiment of a system 500 that stores such computer-readable files. This system 500 may include at least one processor 510, memory 524 and one or more signal lines or communication busses 522 for coupling these components to one another. Memory 524 may include high-speed random access memory and/or non-volatile memory, such as: ROM, RAM, EPROM, EEPROM, flash, one or more smart cards, one or more magnetic disc storage devices, and/or one or more optical storage devices.

Memory 524 may store a circuit compiler 526 and circuit descriptions 528. Circuit descriptions 528 may include descriptions of the circuits, or a subset of the circuits discussed above with respect to FIGS. 1A and 1B. In particular, circuit descriptions 528 may include circuit descriptions of: one or more memory controllers 530, one or more processors 532, one or more memory devices 534, one or more memory modules 536, control logic 538, one or more switches 540, and/or one or more termination impedances 542.

In some embodiments, system 500 includes fewer or additional components. Moreover, two or more components can be combined into a single component, and/or a position of one or more components may be changed.

While the preceding embodiments have used inter-chip or inter-device communication as an illustrative example, in other embodiments the communication technique may be used in conjunction with intra-chip or intra-device communication. For example, such communication may occur between components disposed on a given integrated circuit.

In some embodiments, a first system includes: a first memory controller that includes control logic, a first memory device, a second memory device, and a first memory bus. Moreover, the first memory bus has a first bus segment coupled to the first memory controller and the first memory device, a second bus segment coupled to the second memory device, and a first switch to selectively couple and decouple the first bus segment and the second bus segment in response to control information from the control logic. Note that the control logic may output control information to the first switch to selectively decouple the first bus segment and the second bus segment to effect a change in an electrical length of the memory bus to enable data transfer with respect to the first memory device at a first data rate. Additionally, the control logic may output control information to the first switch to selectively couple the first bus segment and the second bus segment to effect another change in the electrical length of the memory bus to enable data transfer with respect to the second memory device at a second data rate that is slower than the first data rate.

In some embodiments, the first memory controller is included on an integrated circuit, such as a processor.

In some embodiments, a first on-die termination (ODT) of the first memory device is modified in conjunction with a state of the first switch. For example, the first ODT may have a first impedance when the first switch is open, and the first ODT may have a second impedance when the first switch is closed, where the second impedance is higher than the first impedance. Moreover, a second ODT of the second memory device may have a third impedance when the first switch is closed, where the third impedance is less than the second impedance. Note that the first impedance or the third impedance may approximately match an impedance of the first memory bus.

In some embodiments, the first memory device is inactive when the first switch is closed and is active when the first switch is open.

In some embodiments, a given memory device, which can be the first memory device or the second memory device, is disposed on a memory module. For example, the memory module may include a socket that couples the memory module to the first memory bus.

In some embodiments, the given memory device is included in a memory system.

Moreover, in some embodiments the first switch is external to the first memory device and is external to the second memory device. Additionally, the first switch may include a double-pole single-throw switch.

In some embodiments, the given memory device is soldered to a motherboard.

Note that the given memory device may include dynamic random access memory (DRAM) and/or flash memory.

In some embodiments, the first data rate and the second data rate are pre-determined.

In some embodiments, the control logic communicates commands to the first memory device and the second memory device using different command rates. Moreover, the control logic may migrate data to or from the given memory device based on: a performance metric of the first system and/or power consumption in the first system.

In some embodiments, the first memory device is included in a first performance region of the memory bus and the second memory device is included in a second performance region of the memory bus.

Another embodiment provides a first circuit that includes the first memory bus, the first memory device, the second memory device, and the first switch. Note that the first circuit may be disposed on a second integrated circuit.

Another embodiment provides a computer-readable medium that includes data that specifies the first circuit.

Another embodiment provides a first method for communicating data, which may be performed by control logic in a system (such as control logic in a memory controller and/or control logic in a processor). During operation, the control logic selects a state of the first switch between the first memory device coupled to the first memory bus in the first performance region of the memory bus and the second memory device coupled to the first memory bus in the second performance region of the first memory bus to change a electrical length of the first memory bus. Note that a given performance region, which can be the first performance region or the second performance region, may convey information at a given data rate. Moreover, the control logic may communicate with the given memory device, where communication with the first memory device is at the first data rate and communication with the second memory device is at the second data rate, and where the second data rate is less than the first data rate.

Another embodiment provides a second system that includes: a second memory controller that includes control logic, a third memory device, a fourth memory device, and a second memory bus. Moreover, the second memory bus has a first bus segment coupled to the second memory controller and the third memory device, a second bus segment coupled to the fourth memory device, and a second switch to selectively couple and decouple the first bus segment and the second bus segment in response to control information from the control logic. Note that the control logic may output control information to the second switch to selectively decouple the first bus segment and the second bus segment to effect a change in an electrical length of the second memory bus to enable data transfer with respect to the third memory device. Additionally, the control logic may output control information to the second switch to selectively couple the first bus segment and the second bus segment to effect another change in the electrical length of the second memory bus to enable data transfer with respect to the fourth memory device. Furthermore, an ODT of a given memory device, which can be the third memory device or the fourth memory device, may be modified based on the state of the second switch.

In some embodiments, the second memory controller is included on a third integrated circuit, such as a processor.

In some embodiments, a first ODT of the third memory device may have a first impedance when the second switch is open, and the first ODT may have a second impedance when the switch is closed, where the second impedance is higher than the first impedance. Moreover, a second ODT of the fourth memory device may have a third impedance when the second switch is closed, where the third impedance is less than the second impedance. Note that the first impedance or the third impedance may approximately match an impedance of the second memory bus.

In some embodiments, the third memory device is inactive when the second switch is closed and is active when the second switch is open.

In some embodiments, the given memory device is disposed on another memory module. For example, the other memory module may include a socket that couples the other memory module to the second memory bus.

In some embodiments, the given memory device is included in another memory system.

Moreover, in some embodiments the second switch is external to the third memory device and is external to the fourth memory device. Additionally, the second switch may include a double-pole single-throw switch.

In some embodiments, the given memory device is soldered to another motherboard.

Note that the given memory device may include dynamic random access memory (DRAM) and/or flash memory.

In some embodiments, the control logic migrates data to or from the given memory device based on: a performance metric of the second system and/or power consumption in the second system.

Another embodiment provides a second circuit that includes the second memory bus, the third memory device, the fourth memory device, and the second switch. Note that the second circuit may be disposed on a fourth integrated circuit.

Another embodiment provides a computer-readable medium that includes data that specifies the second circuit.

Another embodiment provides a second method for communicating data, which may be performed by control logic in a system (such as control logic in a memory controller and/or control logic in a processor). During operation, the control logic selects a state of the second switch between the third memory device coupled to the second memory bus and the fourth memory device coupled to the second memory bus to change an electrical length of the second memory bus. Moreover, the control logic modifies an ODT of the given memory device, which can be the third memory device or the fourth memory device, based on the state of the second switch.

The preceding description has been presented to enable any person skilled in the art to make and use the disclosed embodiments, and was provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

Moreover, the foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A system, comprising:
a memory controller that includes control logic;
a first memory device;
a second memory device; and
a memory bus having a first bus segment coupled to the memory controller and the first memory device, a second bus segment coupled to the second memory device, and a switch to selectively couple and decouple the first bus segment and the second bus segment in response to control information from the control logic, wherein the control logic outputs control information to the switch to selectively decouple the first bus segment and the second bus segment to effect a change in an electrical length of the memory bus to enable data transfer with respect to the first memory device at a first data rate; and
wherein the control logic outputs control information to the switch to selectively couple the first bus segment and the second bus segment to effect another change in the electrical length of the memory bus to enable data transfer with respect to the second memory device at a second data rate that is slower than the first data rate.

2. The system of claim 1, wherein the memory controller is disposed on an integrated circuit.

3. The system of claim 1, wherein the memory controller is included in a processor.

4. The system of claim 1, wherein a first on-die termination (ODT) of the first memory device is modified in conjunction with a state of the switch.

5. The system of claim 4, wherein the first ODT has a first impedance when the switch is open;
wherein the first ODT has a second impedance when the switch is closed; and
wherein the second impedance is higher than the first impedance.

6. The system of claim 5, wherein a second ODT of the second memory device has a third impedance when the switch is closed; and
wherein the third impedance is less than the second impedance.

7. The system of claim 6, wherein a given impedance, which can be the first impedance or the third impedance, approximately matches an impedance of the memory bus.

8. The system of claim 1, wherein the first memory device is inactive when the switch is closed and is active when the switch is open.

9. The system of claim 1, wherein a given memory device, which can be the first memory device or the second memory device, is disposed on a memory module.

10. The system of claim 9, wherein the memory module includes a socket to couple the memory module to the memory bus.

11. The system of claim 1, wherein a given memory device, which can be the first memory device or the second memory device, is included in a memory system.

12. The system of claim 1, wherein the switch is external to the first memory device and is external to the second memory device.

13. The system of claim 1, wherein a given memory device, which can be the first memory device or the second memory device, is soldered to a motherboard.

14. The system of claim 1, wherein a given memory device, which can be the first memory device or the second memory device, includes dynamic random access memory (DRAM).

15. The system of claim 1, wherein a given memory device, which can be the first memory device or the second memory device, includes flash memory.

16. The system of claim 1, wherein the first data rate and the second data rate are pre-determined.

17. The system of claim 1, wherein the control logic is to communicate commands to the first memory device and the second memory device using different command rates.

18. The system of claim 1, wherein the control logic is to migrate data to or from a given memory device, which can be the first memory device or the second memory device, based on a performance metric of the system.

19. The system of claim 1, wherein the control logic is to migrate data to or from a given memory device, which can be the first memory device or the second memory device, based on power consumption in the system.

20. The system of claim 1, wherein the switch includes a double-pole single-throw switch.

21. The system of claim 1, wherein the first memory device is included in a first performance region of the memory bus and the second memory device is included in a second performance region of the memory bus.

22. A system, comprising:
a memory controller that includes control logic;
a first memory device;
a second memory device; and
a memory bus having a first bus segment coupled to the memory controller and the first memory device, a second bus segment coupled to the second memory device, and a means for switching to selectively couple and decouple the first bus segment and the second bus segment in response to control information from the control logic, wherein the control logic outputs control information to the means to selectively decouple the first bus segment and the second bus segment to effect a change in an electrical length of the memory bus to enable data transfer with respect to the first memory device at a first data rate; and
wherein the control logic outputs control information to the means to selectively couple the first bus segment and the second bus segment to effect another change in the electrical length of the memory bus to enable data transfer with respect to the second memory device at a second data rate that is slower than the first data rate.

23. A circuit, comprising:
a memory controller that includes control logic;
a first memory device;
a second memory device; and
a memory bus having a first bus segment coupled to the control logic and the first memory device, a second bus segment coupled to the second memory device, and a switch to selectively couple and decouple the first bus segment and the second bus segment in response to control information from the control logic, wherein the control logic outputs control information to the switch to selectively decouple the first bus segment and the second bus segment to change an electrical length of the memory bus to enable data transfer with respect to the first memory device at a first data rate; and
wherein the control logic outputs control information to the switch to selectively couple the first bus segment and the second bus segment to change the electrical length of the memory bus to enable data transfer with respect to the second memory device at a second data rate that is slower than the first data rate.

24. The circuit of claim 23, wherein the circuit is disposed on an integrated circuit.

25. A computer-readable medium containing data representing a circuit, wherein the circuit includes:
a memory controller that includes control logic;
a first memory device;
a second memory device; and
a memory bus having a first bus segment coupled to the control logic and the first memory device, a second bus segment coupled to the second memory device, and a switch to selectively couple and decouple the first bus segment and the second bus segment in response to control information from the control logic, wherein the control logic outputs control information to the switch to selectively decouple the first bus segment and the second bus segment to effect a change in an electrical length of the memory bus to enable data transfer with respect to the first memory device at a first data rate; and
wherein the control logic outputs control information to the switch to selectively couple the first bus segment and the second bus segment to effect another change in the electrical length of the memory bus to enable data transfer with respect to the second memory device at a second data rate that is slower than the first data rate.

26. A method for communicating data, comprising:
selecting a state of a switch between a first memory device coupled to a memory bus in a first performance region of the memory bus and a second memory device coupled to the memory bus in a second performance region of the memory bus to change an electrical length of the memory bus, wherein a given performance region, which can be the first performance region or the second performance region, conveys information at a given data rate; and
communicating with a given memory device, which can be the first memory device or the second memory device, wherein communication with the first memory device is at a first data rate and communication with the second memory device is at a second data rate; and
wherein the second data rate is less than the first data rate.

27. A system, comprising:
a memory controller that includes control logic;
a first memory device;
a second memory device; and
a memory bus having a first bus segment coupled to the memory controller and the first memory device, a second bus segment coupled to the second memory device, and a switch to selectively couple and decouple the first bus segment and the second bus segment in response to control information from the control logic, wherein the control logic outputs control information to the switch to selectively decouple the first bus segment and the second bus segment to effect a change in an electrical length of the memory bus to enable data transfer with respect to the first memory device;
wherein the control logic outputs control information to the switch to selectively couple the first bus segment and the second bus segment to effect another change in the electrical length of the memory bus to enable data transfer with respect to the second memory device; and
wherein on-die termination (ODT) of a given memory device, which can be the first memory device or the second memory device, is modified based on the state of the switch.

28. The system of claim 27, wherein the memory controller is disposed on an integrated circuit.

29. The system of claim 27, wherein the memory controller is included in a processor.

30. The system of claim 27, wherein a first ODT of the first memory device has a first impedance when the switch is open;
wherein the first ODT has a second impedance when the switch is closed; and
wherein the second impedance is higher than the first impedance.

31. The system of claim 30, wherein a second ODT of the second memory device has a third impedance when the switch is closed; and
wherein the third impedance is less than the second impedance.

32. The system of claim 31, wherein a given impedance, which can be the first impedance or the third impedance, approximately matches an impedance of the memory bus.

33. The system of claim 27, wherein the first memory device is inactive when the switch is closed and is active when the switch is open.

34. The system of claim 27, wherein the given memory device is disposed on a memory module.

35. The system of claim 34, wherein the memory module includes a socket to couple the memory module to the memory bus.

36. The system of claim 27, wherein the given memory device is included in a memory system.

37. The system of claim 27, wherein the switch is external to the first memory device and is external to the second memory device.

38. The system of claim 27, wherein the given memory device is soldered to a motherboard.

39. The system of claim 27, wherein the given memory device includes dynamic random access memory (DRAM).

40. The system of claim 27, wherein the given memory device includes flash memory.

41. The system of claim 27, wherein the control logic is to migrate data to or from the given memory device based on a performance metric of the system.

42. The system of claim 27, wherein the control logic is to migrate data to or from the given memory device based on power consumption in the system.

43. The system of claim 27, wherein the switch includes a double-pole single-throw switch.

44. A system, comprising:
a memory controller that includes control logic;
a first memory device;
a second memory device; and
a memory bus having a first bus segment coupled to the memory controller and the first memory device, a second bus segment coupled to the second memory device, and a means for switching to selectively couple and decouple the first bus segment and the second bus segment in response to control information from the control logic, wherein the control logic outputs control information to the means to selectively decouple the first bus segment and the second bus segment to effect a change in an electrical length of the memory bus to enable data transfer with respect to the first memory device;
wherein the control logic outputs control information to the means to selectively couple the first bus segment and the second bus segment to effect another change in the electrical length of the memory bus to enable data transfer with respect to the second memory device; and
wherein on-die termination (ODT) of a given memory device, which can be the first memory device or the second memory device, is modified based on the state of the means.

45. A circuit, comprising:
a memory controller that includes control logic;
a first memory device;
a second memory device; and
a memory bus having a first bus segment coupled to the control logic and the first memory device, a second bus segment coupled to the second memory device, and a switch to selectively couple and decouple the first bus segment and the second bus segment in response to control information from the control logic, wherein the control logic outputs control information to the switch to selectively decouple the first bus segment and the second bus segment to change an electrical length of the memory bus to enable data transfer with respect to the first memory device;
wherein the control logic outputs control information to the switch to selectively couple the first bus segment and the second bus segment to change the electrical length of the memory bus to enable data transfer with respect to the second memory device; and
wherein on-die termination (ODT) of a given memory device, which can be the first memory device or the second memory device, is modified based on the state of the switch.

46. The circuit of claim 45, wherein the circuit is disposed on an integrated circuit.

47. A computer-readable medium containing data representing a circuit, wherein the circuit includes:
a memory controller that includes control logic;
a first memory device;
a second memory device; and
a memory bus having a first bus segment coupled to the control logic and the first memory device, a second bus segment coupled to the second memory device, and a switch to selectively couple and decouple the first bus segment and the second bus segment in response to control information from the control logic, wherein the control logic outputs control information to the switch to selectively decouple the first bus segment and the second bus segment to change an electrical length of the memory bus to enable data transfer with respect to the first memory device;
wherein the control logic outputs control information to the switch to selectively couple the first bus segment and the second bus segment to change the electrical length of the memory bus to enable data transfer with respect to the second memory device; and
wherein on-die termination (ODT) of a given memory device, which can be the first memory device or the second memory device, is modified based on the state of the switch.

48. A method for communicating data, comprising:
selecting a state of a switch between a first memory device coupled to a memory bus and a second memory device coupled to the memory bus to change a electrical length of the memory bus; and
modifying on-die termination (ODT) of a given memory device, which can be the first memory device or the second memory device, based on the state of the switch.

* * * * *